April 30, 1935.  B. WALKER ET AL  1,999,221
FUEL METERING OR INJECTING AND CONTROLLING
SYSTEM FOR INTERNAL COMBUSTION ENGINES
Filed July 1, 1929   5 Sheets-Sheet 1
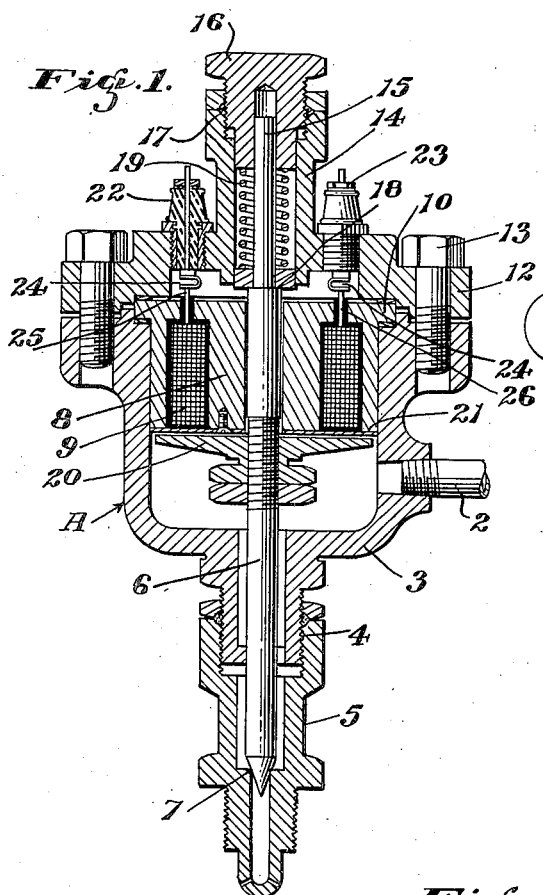
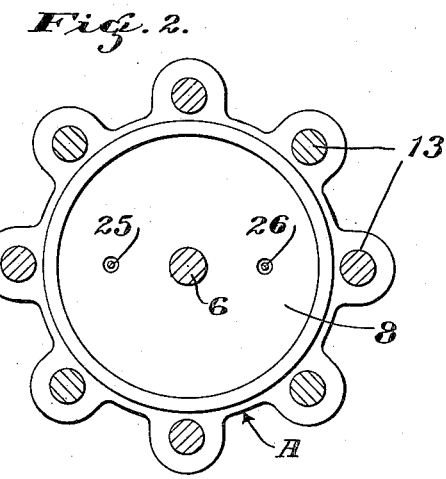
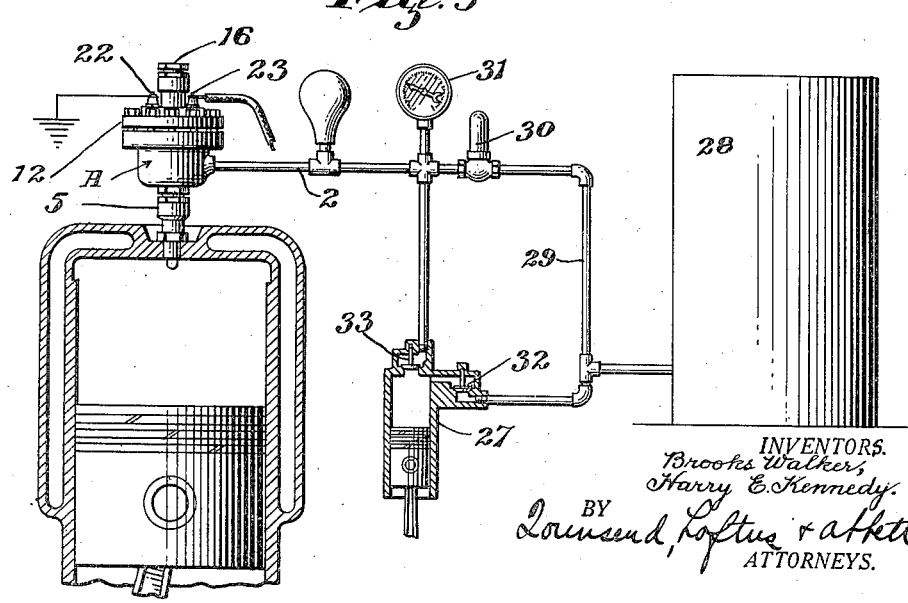
INVENTORS.
Brooks Walker,
Harry E. Kennedy.
BY
Townsend, Loftus & Hackett
ATTORNEYS.

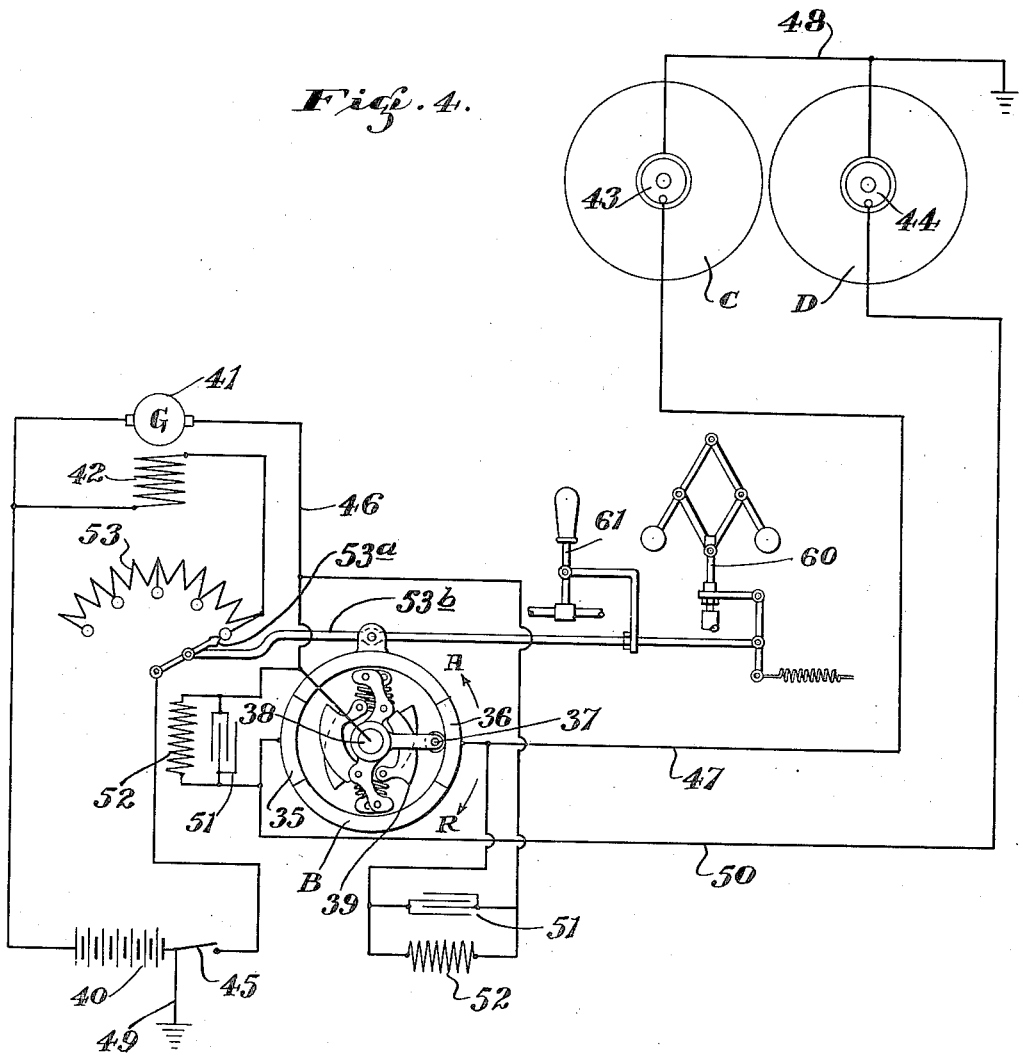

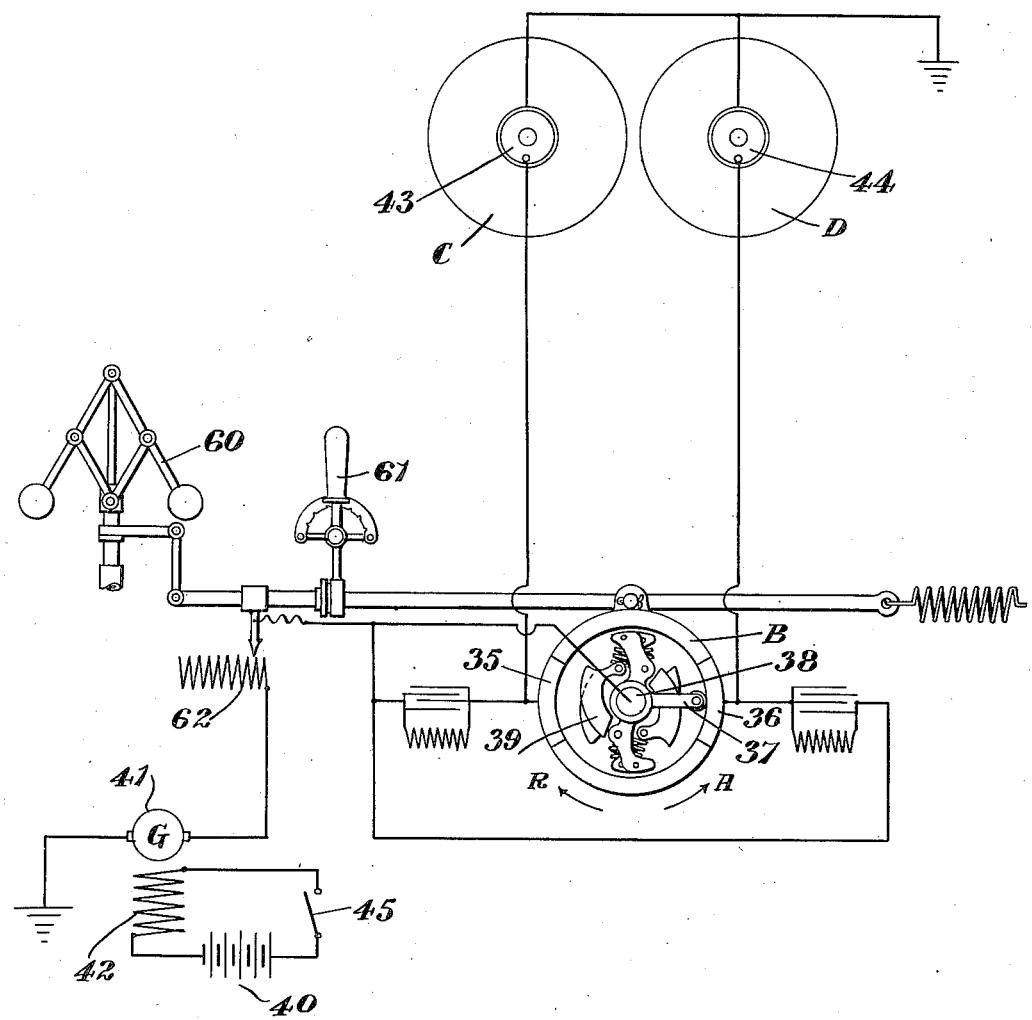

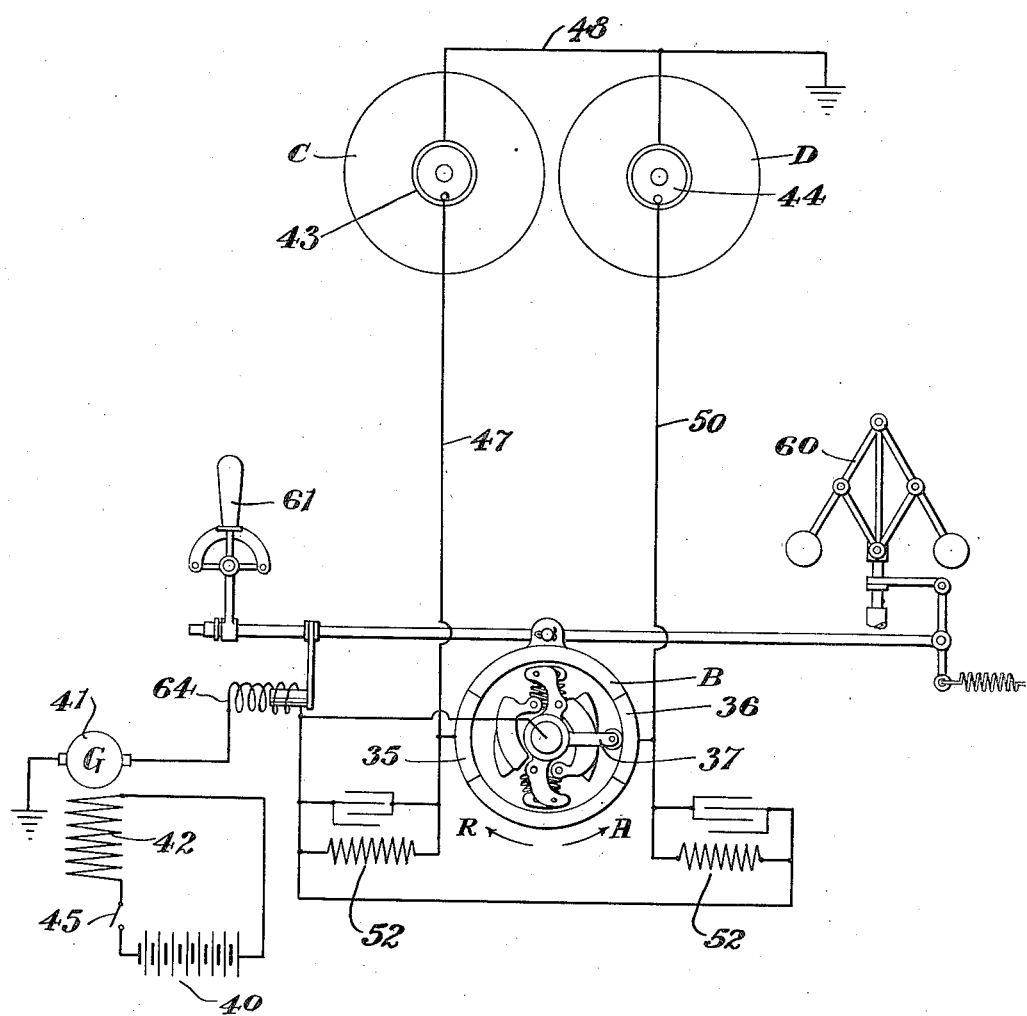

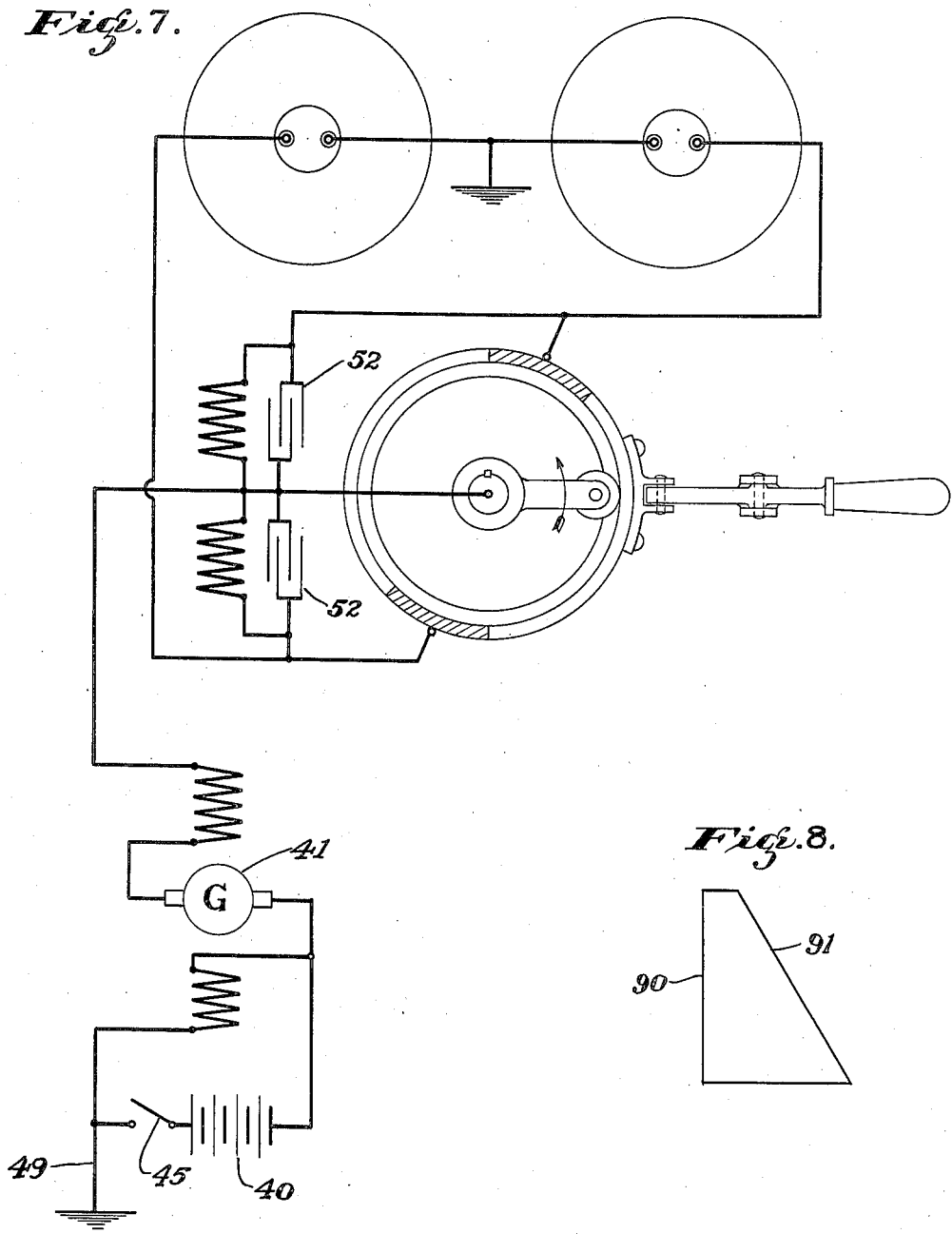
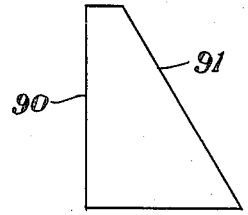

Patented Apr. 30, 1935

1,999,221

UNITED STATES PATENT OFFICE 1,999,221

FUEL METERING OR INJECTING AND CONTROLLING SYSTEM FOR INTERNAL COMBUSTION ENGINES

Brooks Walker, Piedmont, and Harry E. Kennedy, Berkeley, Calif., assignors of one-third to Clinton L. Walker, Piedmont, Calif.

Application July 1, 1929, Serial No. 375,153

1 Claim. (Cl. 123—32)

This invention relates to fuel metering or injecting and controlling systems for internal combustion engines, and especially to a fuel injecting and controlling system which is adapted to variable speed and high speed Diesel engines, such as used in tractors, trucks, automobiles etc.

The object of the present invention is to generally improve the operation of fuel metering or injecting and controlling systems for internal combustion engines; to provide an electromagnetic fuel metering and injecting valve; to provide a valve wherein exceedingly small lifts may be obtained, for instance one one-thousandths of an inch or less, so that the quantity of fuel injected may be partially regulated by the valve lift; to provide means whereby the valve may be maintained in a lifted or open position for a predetermined duration, regardless of the speed of the engine; to provide means for varying the said duration at any speed; to provide means for advancing or retarding the time of fuel injection; and further to provide means whereby the lift of the valve and the spring tension thereon, may be adjusted.

The invention is shown by way of illustration in the accompanying drawings, in which:

Fig. 1 is a central vertical longitudinal section of the electro-magnetically actuated fuel metering and injecting valve, Fig. 2 is a plan view of the same, showing the head of the valve housing removed, Fig. 3 is a diagrammatic view showing the fuel injecting valve applied to an internal combustion engine, said view showing a pressure rail system and the pump whereby the fuel is delivered thereto, Fig. 4 is a diagrammatic view showing an electric circuit whereby the magnets are actuated, said view also showing a standard form of distributor and a variable resistance in the field of the generator, Fig. 5 is a modified diagrammatic view of the electric circuit showing the variable resistance in the armature circuit, Fig. 6 is a similar view showing the electric circuit controlled by a variable inductance, Fig. 7 is a diagrammatic view showing a method of varying the contact arc to obtain throttling, Fig. 8 is a side elevation of one of the contacts required by the distributor shown in Fig. 7.

Referring to the drawings in detail, particularly Fig. 1, which is a central vertical sectional view of the fuel metering and injecting valve, A indicates a cylindrical shaped housing, to which fuel under pressure is delivered from a pipe 2, said pipe being connected with a pressure rail system, as will hereinafter be described.

The lower end of the housing is closed by a permanent bottom section 3, and this is extended and threaded, as at 4 to receive a spray nozzle 5, and also to provide means for adjusting the valve lift. The fuel valve stem, indicated at 6, extends through the extension 4, and it is guided thereby and it extends into the nozzle 5 and normally engages a seat 1 formed therein. The valve stem 6 extends through the core portion 8 of the magnet, the coil of which is indicated at 9, this magnet being provided with an annular shoulder 10 whereby it is supported and secured in the housing.

The housing is provided with a head member 12, and this is secured by bolts 13, the magnet being thus clamped and secured between the head and the main housing, and gaskets may here be inserted to avoid any fuel leakage or loss. The head member is provided with an extension 14, into which the upper end of the valve stem projects, as shown at 15. It is here guided by a nut 16, which engages a packing 17 to render this connection fuel-tight. A shoulder 18 is formed on the rod, and a spring 19 is interposed between this shoulder and the lower end of the nut 16. The spring serves the function of retaining the valve on its seat, and by adjusting the position of the nut more or less spring tension is applied.

The valve stem carries an armature plate, generally indicated at 20. This plate is rigidly secured on the valve stem, and it is attracted and raised upwardly against the pole face of the magnet when the magnet is energized and during de-energization it is forced downwardly by the spring 19. Hence, the valve is seated by spring action, and it is raised by electro-magnetic action. A thin disc or shim of non-magnetic material, such as shown at 21 is preferably interposed between the core and the armature plate, so as to reduce the effect of any residual magnetism. The electric current to energize the magnet or the coil 9 passes through two insulated terminals, generally indicated at 22 and 23. These terminals are of the spark plug type, the only difference being that they only require one terminal, these terminals engaging springs as shown at 24, which in turn are connected to the terminals 25 and 26 of coil 9. The springs are more or less essential, as they insure good contact between the terminals, the plug and the terminals of the coil.

The electro-magnetically actuated fuel valve illustrated may be used in conjunction with different fuel injecting systems, but in the present instance it is shown as connected with a pressure rail system, see Fig. 3. In that figure the numeral 2 indicates the pressure rail, 27 the fuel pump, 28 the supply tank, 29 a return pipe, 30 a fuel pressure regulating valve of standard construction, and 31 a pressure gauge.

In actual operation the pump draws oil from the tank 28 through the suction valve 32 and discharges the oil through a valve 33, into the pressure rail 2, any excess fuel being by-passed through the pressure regulating valve 30 and the return pipe 29 the moment a predetermined pressure is exerted. This general system is old per se but it is nevertheless illustrated for the purpose of describing the function and operation of the fuel injecting valve.

In actual operation it will be understood that with the engine running the pump will operate, and a constant fuel pressure will be maintained in the rail. This rail is in direct communication with the valve housing, as shown in Figs. 1 and 3, and fuel will accordingly be injected whenever the valve is lifted.

The current supplied to actuate the valve, and the manner in which it is generated and controlled forms an important feature of the present application. By referring to Fig. 4 it will be noted that a standard form of distributor is employed, and this is indicated at B. The distributor is provided with two stationary contacts, such as shown at 35 and 36, and these are engaged by a distributor arm 37 once during each revolution of shaft 38, this shaft being driven from the cam shaft of the engine if applied to a four-cycle type, or being driven at crank shaft speed if applied to a two-cycle type of engine.

The distributor is also provided with an automatic advancing mechanism, generally indicated at 39, this being merely diagrammatically illustrated as a standard form of governor. The current required is, in this instance, supplied by a battery, such as shown at 40, and by a generator indicated at 41 and 42, the member 41 being the armature, and 42 the field coil. The battery supplies the current when starting, and the voltage generated by the generator is added thereto when the engine is in operation.

A two-cylinder engine is illustrated in the present instance, one cylinder at C and the other at D, the cylinder C carrying an electro-magnetically actuated valve 43 and the other cylinder an electro-magnetically actuated valve such as shown at 44. The circuit through these valves can be traced as follows:

With the engine in operation switch 45 will be closed. The current from the armature passes through the wire 46 which is connected with the shaft, and the distributor arm 37. If this engages the contact 36 the current will pass through wire 47, the electro-magnetically actuated valve 43 and the wire 48 which connects with ground, this being possible as the return circuit is through the ground, as shown at 49. If the distributor arm engages the contact 35 the current will pass through wire 46, distributor arm 37, contact 35, and wire 50. It will then pass through the electro-magnetically actuated valve 44 and wire 48, thereby completing the circuit.

To avoid sparking at the contacts a condenser and a resistance is connected across the terminals in the usual manner, the condensers and resistances employed being indicated at 51 and 52.

The circuit so far described merely discloses the circuits through the generator, the battery, distributor and the electro-magnets. It will, however, be noted that the variable resistance generally indicated at 53, is placed in the field circuit 42. The variable resistance placed in this circuit varies the current output of the generator, and as such makes it possible to increase or decrease the duration of time which each valve remains open. The variable resistance accordingly functions as an ordinary throttle. It may be governor actuated, as shown at 60, or it may be manually actuated through the lever shown at 61.

The three important features obtained by the valve and the electric actuating mechanism here illustrated are:

First: Means for regulating the lift of the valve and the spring tension thereon, Second: Means for holding a fuel injecting valve open a predetermined duration throughout a predetermined range of motor speed, Third: Means for reducing this time period.

These features will require explanation. The first feature, to wit, that of regulating the lift of the valve, is easily understood as it is clearly shown in Fig. 1. If the spray nozzle is turned so as to move downwardly on the threaded extension 4, valve 6 and the armature plate 20 secured thereto will move downwardly with the seat 7, hence increasing the lift of the valve as the distance between the armature plate and the core are increased. Conversely, by turning the spray nozzle in the opposite direction the lift will be decreased. Likewise, by adjusting nut 16 the tension of spring 19 is varied, and this in turn varies the current necessary to lift the valve.

By employing an electro-magnetic valve, as here illustrated, it is possible to obtain exceedingly small lifts, and in actual practice, applicant has been able to produce lifts of one one-thousandth of an inch or less, and to that extent he is able to partially control the amount of fuel injected. That is, with a small lift only a certain amount of fuel can pass by the valve into the spray nozzle during a given duration of lift, assuming that the pressure on the fuel remains constant. It is accordingly only necessary to provide means for regulating the time period to obtain perfect control of the quantity of fuel injected. This control is obtained by the current output of the generator, and the variable resistance 53. This will be described as the second feature, to wit:

Means for holding a fuel injecting valve open for a predetermined duration regardless of the speed of the motor.

To explain this it is necessary to state that a generator must be employed which is capable of generating a current proportional to engine speed. In other words, as the speed of the engine increases the current output of the generator increases substantially in proportion, hence a current of gradually increasing strength is obtained as the speed of the engine increases and conversely the strength of the current decreases as the speed of the motor decreases.

Another feature that must be considered is the fact that an inductance such as an electro-magnet has a certain lag. That is, an electro-magnet is not instantly energized the moment the circuit is closed therethrough. It takes time before the flux reaches a sufficient value to lift the valve and this time element is known as the lag. If a circuit is closed through one of the magnets when the engine is running at comparatively slow speed, it will energize the magnet during a given time period, and will hold it open until the circuit is broken by the distributor arm leaving the contact and the magnetic flux has diminished to a value insufficient to hold the valve open. If the engine is run at double that speed, the contacts through which the circuit is made will remain closed for only one half the time. If the same current is supplied the lag time will remain the same, and as a consequence the valve will remain open for a much shorter duration per injection, due to the increased speed of the engine, hence a smaller quantity of fuel will be injected.

This, however, is not the case in the present instance because, as the engine speed increases, the current or voltage increase of the generator becomes a function of engine speed. Hence the lag is increased, thus compensating for the shorter contact period, and thereby give the same period as at the slower speed. Due to the fact that the current strength increases as a function of engine speed, it is possible to retain the valve open for a given duration at any engine speed, and by providing a variable resistance such as shown at 53 it is possible to throttle, by reducing the current. If the current is reduced at a given speed the valve will open later and the time period of opening will accordingly be reduced. Since we utilize variation in the lag of the magnetic valve to effect throttling, a variation in the point of admission at a given engine speed results; to compensate for this variation an interconnection 53a is formed between the impedance control arm 53b and the distributor which advances the distributor with increased impedance or vice versa.

The variable resistance or throttling mechanism employed may be placed in the field circuit of the generator, as shown at 53 in Fig. 4. Again the current flow may be increased or decreased by a variable inductance, as shown at 64, see Fig. 6, or by variable armature impedance as shown at 62 in Fig. 5, or a variable contact length may be employed as illustrated in Fig. 8.

The provision of automatic means for retaining the valve open for a given time period during changed speeds of the engine is exceedingly important, as it permits the engine to be run at full load at these speeds. This is accomplished as previously stated by providing a generator whose current increases or decreases as a function of engine speed.

The provision of variable resistance or inductance is also important, as it functions as the throttle to increase or decrease this time period, hence providing means for running the engine at reduced load at any speed.

If, in addition thereto, means are employed for regulating the valve lift and spring tension, it is more or less apparent that an ideal fuel control has been provided which is particularly adapted for engines operating under variable speeds and loads, and it is also apparent that it is equally applicable to high speed engines.

In Figs. 4, 5 and 6 we have illustrated means for varying the quantity of fuel injected, by regulating the current supplied to the valve by controlling field current, generated current or adding impedance.

In the structures so far described, throttling has been accomplished by varying the current so as to vary the duration that the valve remains open.

In the structure shown in Figs. 7 and 8 throttling or varying the duration that the valve remains open is accomplished by varying the contact period in the distributor. The current supply to the distributor has the same speed variation characteristics, i. e. the current only increases or decreases with speed changes. In this instance throttling can only be effected by varying the length or arc of contact in the distributor. This is accomplished by employing contacts having a shape such as shown in Fig. 8. In this contact the leading edge indicated at 90 is parallel to the axis of the distributor, so as to maintain a timing of the start of fuel admission and throttling is accomplished by varying the length of contact, as by providing the inclined edge shown at 91, it being understood that the cage of the distributor is movably mounted with respect to the longitudinal axis of the distributor.

In connection with the showing in Fig. 8 I desire to have it understood that while I have, for the purpose of simplifying the drawings, omitted showing the speed responsive distributor arm advancing mechanism, such a mechanism might be incorporated in a distributor having the features described in the preceding paragraph.

While certain features of the present invention are more or less specifically described, I wish it understood that various changes may be resorted to within the scope of the appended claim, similarly, that the materials and finishes of the several parts employed may be such as the manufacturer may decide, or varying conditions or uses may demand.

Having thus described our invention, what we claim and desire to secure by Letters Patent is:

In a fuel supply system an electro-magnetically actuated fluid metering valve, and a generator driven by the engine whereby electric current is generated to actuate the valve for substantially constant durations of fluid injection periods, the electro-magnet that actuates said fluid metering valve being comprised in an electric circuit that is directly supplied from and by said generator, which said generator supplies directly to said electro-magnet current which increases or decreases as a function of the engine speed.

HARRY E. KENNEDY.
BROOKS WALKER.